(12) United States Patent
Wang et al.

(10) Patent No.: US 8,127,167 B2
(45) Date of Patent: Feb. 28, 2012

(54) METHODS FOR REDUCING POWER CONSUMPTION AND DEVICES USING THE SAME

(75) Inventors: Chao Chun Wang, Taipei (TW); Yung-Sheng Chiu, Taipei (TW); Ren-Yu Yu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 408 days.

(21) Appl. No.: 12/413,713

(22) Filed: Mar. 30, 2009

(65) Prior Publication Data

US 2010/0250980 A1 Sep. 30, 2010

(51) Int. Cl.
*G06F 1/32* (2006.01)
(52) U.S. Cl. .................... 713/324; 713/320; 713/323
(58) Field of Classification Search .................. 713/300, 713/320, 324
See application file for complete search history.

(56) References Cited

U.S. PATENT DOCUMENTS

| | | | | |
|---|---|---|---|---|
| 6,457,108 B1 * | 9/2002 | Hsu et al. | ...................... | 711/154 |
| 7,930,565 B2 * | 4/2011 | Saewong et al. | .............. | 713/300 |
| 7,941,682 B2 * | 5/2011 | Adams | ........................... | 713/322 |
| 2008/0098244 A1 * | 4/2008 | Clinton et al. | ................. | 713/320 |
| 2008/0276105 A1 * | 11/2008 | Hoberman et al. | ........... | 713/300 |
| 2010/0281309 A1 * | 11/2010 | Laurenti et al. | ................ | 714/45 |

FOREIGN PATENT DOCUMENTS

WO    WO 2009/032751    3/2009

* cited by examiner

*Primary Examiner* — Glenn A Auve
(74) *Attorney, Agent, or Firm* — Thomas|Kayden

(57) ABSTRACT

A method for reducing power consumption of a device with an embedded memory module is provided. The device includes comprises a processor, an embedded memory module, a software module, a power supplying unit, and an auxiliary logic. The embedded memory module is accessed by the processor and partitioned into a plurality of memory blocks in accordance with a first predetermined rule. The software module comprises an instruction set and a data set. The software module is segmented into a plurality of segments in accordance with a second predetermined rule. The power supplying unit provides power to the plurality of memory blocks. The auxiliary logic controls the power supplying unit. The power supplied to a memory block is switched on or off in accordance with a condition.

18 Claims, 4 Drawing Sheets

METHODS FOR REDUCING POWER CONSUMPTION AND DEVICES USING THE SAME

BACKGROUND OF THE INVENTION

1. Field of the Invention

The invention relates to a method for reducing power consumption, and more particularly to a method for reducing power consumption for a device employing a system on chip (SOC) while the SOC is in the fully operational mode.

2. Description of the Related Art

A modern system on chip (SOC) is provided for high speed processes and comprises one or more processor cores and a memory directly attached and coupled to the one or more processor cores. Currently, the modern SOC is fabricated with advanced semiconductor process technologies, achieving greatly reduced widths and lengths of transistor gates. However, the problem of static leakage current increases with deeper sub-micro region fabrication of modern SOCs.

Thus, saving power is an important feature for devices employing modern SOCs. For conventional power saving methods, a device employing a modern SOC can operate in an operation mode or a power saving mode. When the device is in the operation mode, a power source must continue to supply power to a memory directly attached and one or more processor cores of the device. As a result, static current leakage of the directly attached memory is a major drain on the power source of a device in the operation mode. When the device is in the power saving mode, the modern SOC is no longer operating at a highest clock rate, wherein operating frequency of the modern SOC is lowered or halted.

Thus, it is desired to provide a method and a system for reducing power consumption, in which power can be saved while the system remains in the operation mode.

BRIEF SUMMARY OF THE INVENTION

An exemplary embodiment of a method for reducing power consumption of a device with an embedded memory module comprises the steps of partitioning the embedded memory module into a plurality of memory blocks; segmenting an instruction set and a data set of a software module into a plurality of segments in accordance with the first predetermined rule, wherein the first predetermined rule is determined according the operation requirement; and loading the plurality of segments into the plurality of. The plurality of memory blocks are switched on or off individually in accordance with a condition.

Another exemplary embodiment of a method for reducing power consumption of a device with an embedded memory module comprises the steps of: segmenting an instruction set and a data set if a software module into a plurality of segments; partitioning the embedded memory module into a plurality of memory blocks in accordance with a first predetermined rule, wherein the first predetermined rule is determined according to the size of the plurality of segments; and loading the plurality of segments into the plurality of the plurality of memory blocks. The plurality of memory blocks are switched on or off individually in accordance with a condition An exemplary embodiment of a device with reduced power consumption comprises a processor, an embedded memory module, a software module, a power supplying unit, and an auxiliary logic. The embedded memory module is accessed by the processor and partitioned into a plurality of memory blocks in accordance with a first predetermined rule. The software module comprises an instruction set and a data set. The software module is segmented into a plurality of segments in accordance with a second predetermined rule. The power supplying unit provides power to the plurality of memory blocks. The auxiliary logic controls the power supplying unit. The power supplied to a memory block is switched on or off in accordance with a condition.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
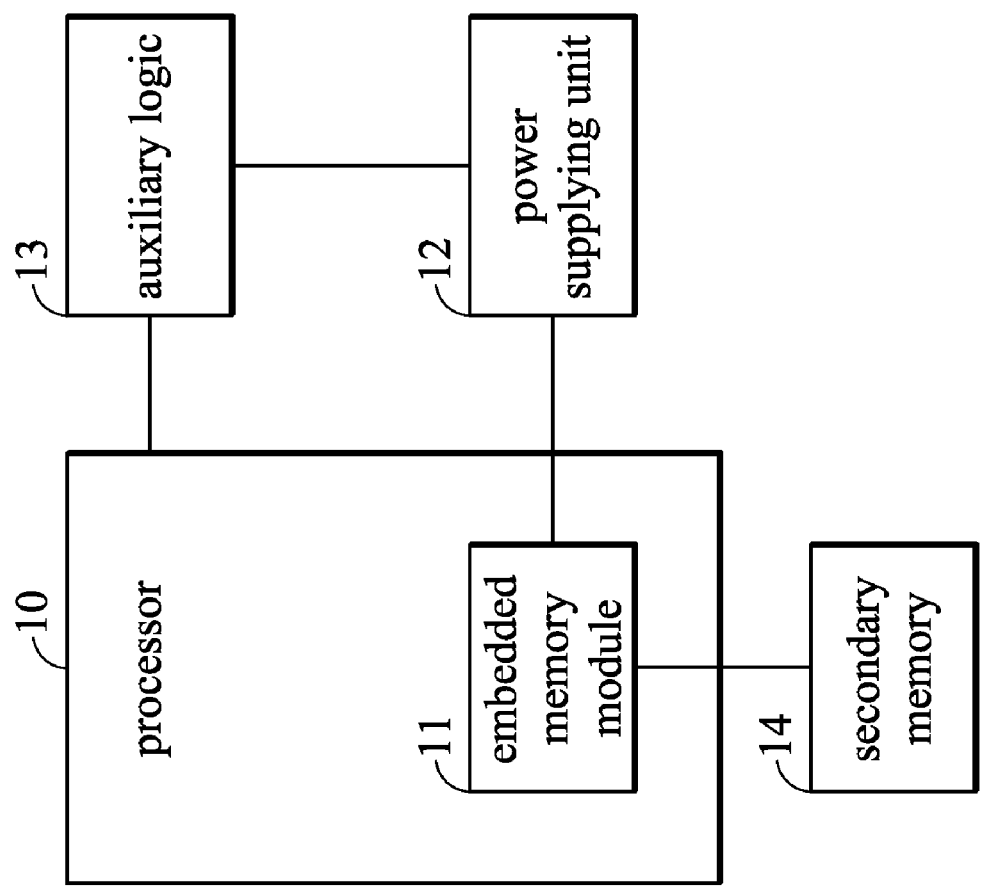
FIG. 1 shows an exemplary embodiment of a device with reduced power consumption of the invention.

The following description is of the best-contemplated mode of carrying out the invention. This description is made for the purpose of illustrating the general principles of the invention and should not be taken in a limiting sense. The scope of the invention is best determined by reference to the appended claims.

Devices with reduced power consumption are provided. In an exemplary embodiment of a device with reduced power consumption in FIG. 1, a device 1 comprises a processor 10, an embedded memory module 11, a power supplying unit 12, and an auxiliary logic 13. The embedded memory module 11 is coupled with and accessed by the processor 10. In the embodiment, the embedded memory module 11 is a directly-attached memory which is coupled with the processor 10 and operates in a single cycle execution, such as a tightly coupled memory. The embedded memory module 11 is partitioned into a plurality of memory blocks MB#0~MB#n, as shown on FIG. 2. The instruction set of a software module executed by the processor 10 and the data set of the software module consumed by the instruction set are segmented into a plurality of segments. The segments are loaded into the memory blocks.

The power supplying unit 12 provides power to the memory blocks MB#0~MB#n of the embedded memory module 11. The auxiliary logic 13 controls the power supplying unit 12 to individually switch the power supplied to the memory blocks MB#1~MB#n on or off. Depending on the memory access pattern or the timing requirement of operations, the auxiliary logic 13 controls the power supplying unit 12 to switch the power supplied to at least one of the memory blocks MB#1~MB#n on or off. For example, when the battery of the device is low, the device may stop the displaying function while still maintaining the urgent call function, such as 911 Call. According to the memory access pattern in the state of low-power, the auxiliary logic 13 controls the power supplying unit 12 to switch off the power supplied to the at least one memory block for the displaying function and switch on the power supplied to the at least one memory block for the urgent call function. Please note the displaying function and urgent call function are only for illustration purpose. There are various instructions for various functionalities in the memory blocks.

According to the embodiment, the power supplied to the memory blocks MB#0~MB#n can be controlled individually. Thus, power savings can be achieved by switching off at least one memory block for the unused instructions and data while the process 10 is in a fully operational mode.

Figure 2:
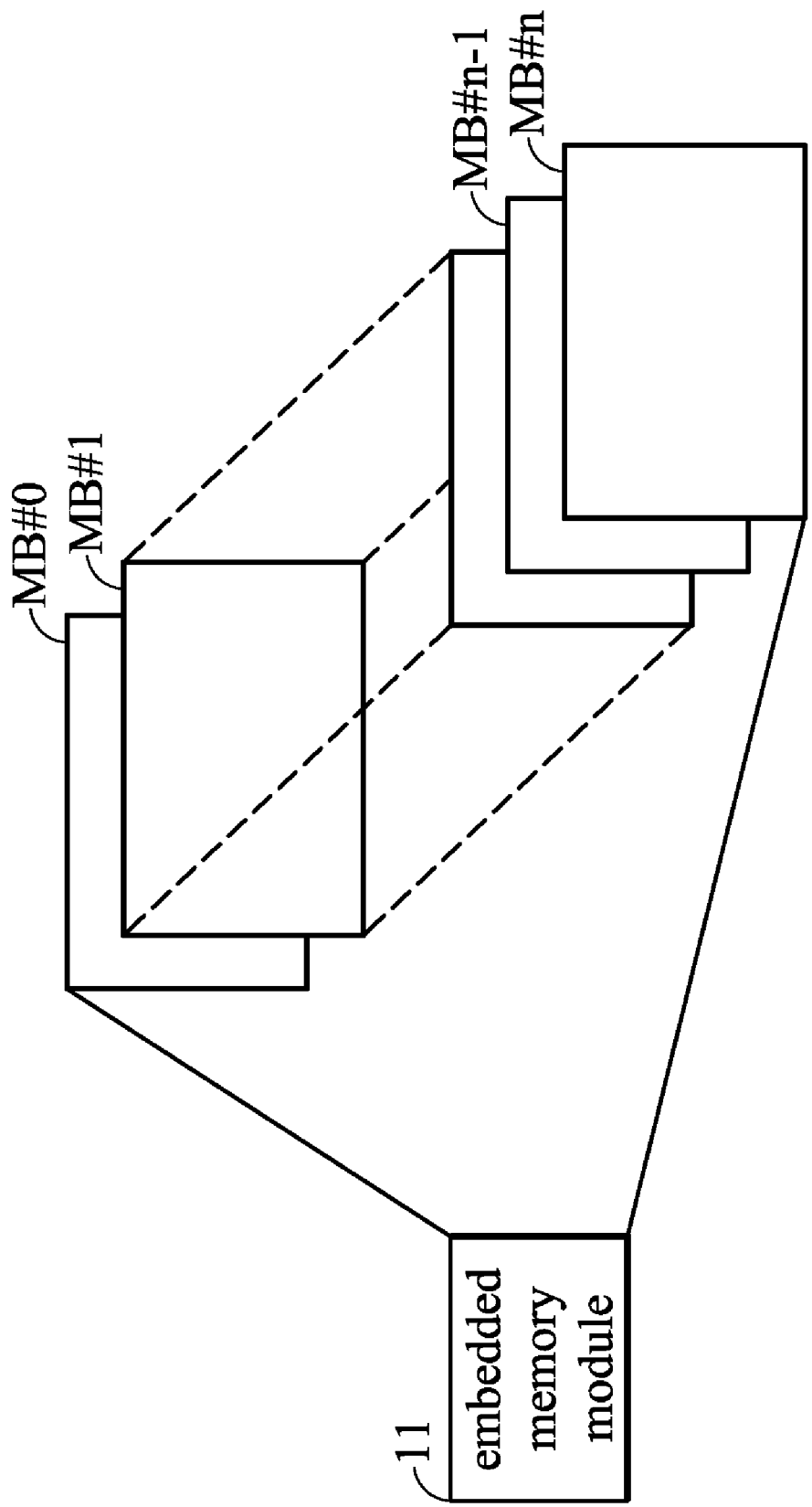
FIG. 2 is a schematic view showing the memory blocks of the memory in the device of FIG. 1.

As shown in FIG. 1, the device 1 further comprises a secondary memory 14 coupled to the embedded memory module 11. The secondary memory 14 stores the segments of at least one memory block in which the power has been switched off. For example, assume that the power supplied to the memory block MB#1 is determined to be switched off according to a memory access pattern. Before the power supplying unit 12 switches off the power supplied to the memory block MB#1, the segment of the memory block MB#1 is transferred to the secondary memory 14 for storage. The power supplied to the memory block MB#1 may be switched on depending upon another memory access pattern. Meanwhile, the segment correlated with the memory block MB#1 which was previously transferred to the secondary memory 14 is restored from the secondary memory 14 to the memory block MB#1 after the power supplying unit 12 switches on the power supplied to the memory block MB#1.

In the embodiment, the auxiliary logic 13 controls the power supplying unit 12 to individually switch the power supplied to all of the memory blocks MB#1~MB#n on or off. In some embodiments, the auxiliary logic 13 controls the power supplying unit 12 to individually switch the power supplied to some of the memory blocks MB#1~MB#n according to different events or conditions, such as memory access pattern, while maintaining the power of the rest memory blocks under an always-on state.

In the embodiment of FIG. 1, the processor 10 and the memory 12 are consisted in a system on chip (SOC). Moreover, in the embodiment of FIG. 1, the auxiliary logic 13 is coupled to the processor 10. In some embodiments, the auxiliary logic 13 can be incorporated into the processor 10.

Figure 3:
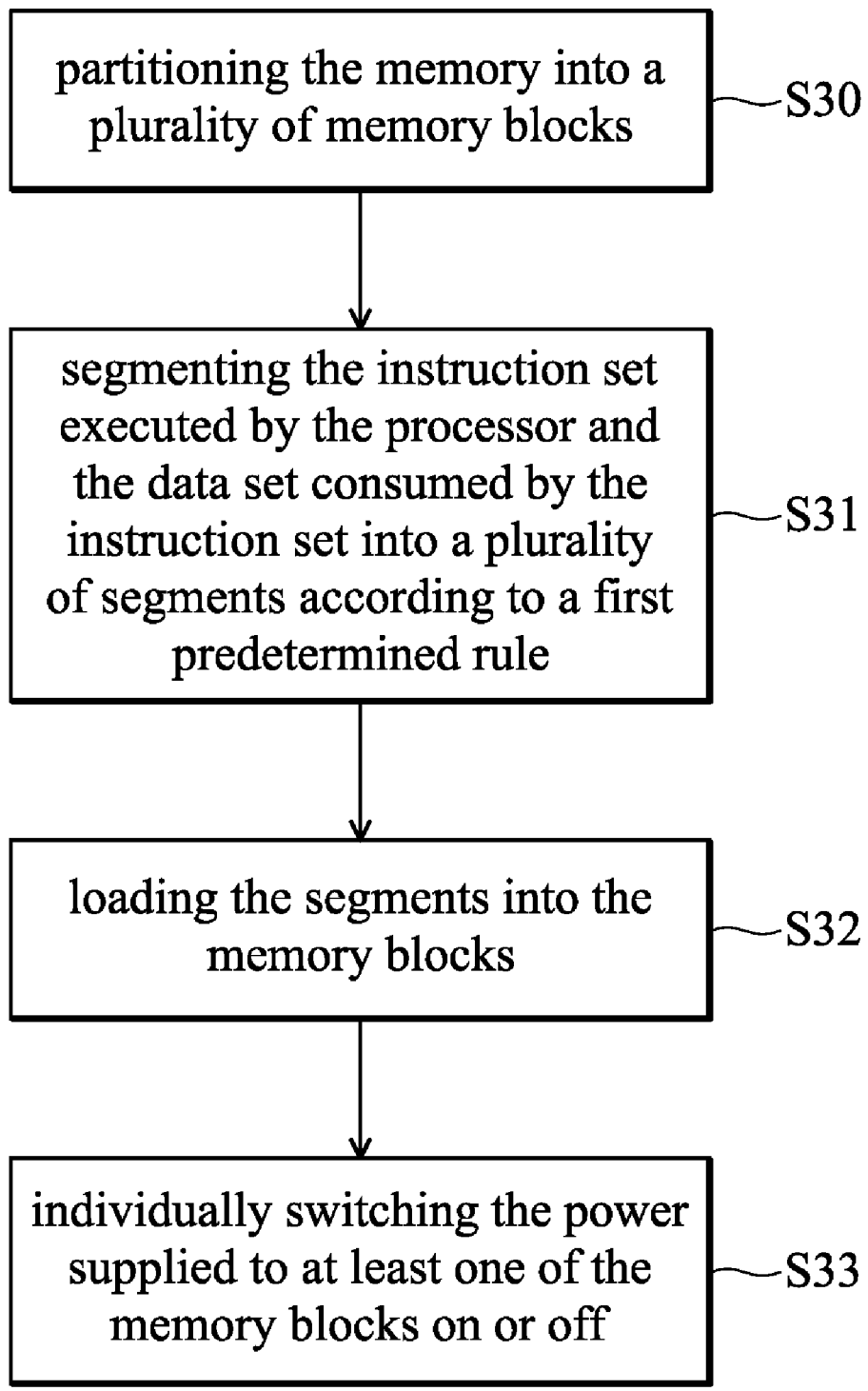
FIG. 3 is a flow chart of an exemplary embodiment for reducing power consumption of a device of the invention.

FIG. 3 is a flow chart of an exemplary embodiment of a method for reducing power consumption of a device. The method will be described with reference to FIGS. 1-3. First, the embedded memory module 11 is partitioned into a plurality of memory blocks MB#0~MB#n (step S30). In the embodiment, the sizes of each memory block are predetermined. For brevity, the size of each memory block in the embedded memory module 11 is equally partitioned in this embodiment, but this should not be considered as the limitation of the present invention. The instruction set of a software module executed by the processor 10 and the data set of the software module consumed by the instruction set are segmented into a plurality of segments according to the first predetermined rule (step S31). For example, when the embedded memory module 11 with 128 MB is partitioned into four 32 MB memory blocks, the instruction set and the data set are also partitioned into four 32 MB segments. Moreover, the instruction set and the data set can be further segmented into segments according to an operation requirement, such as a real time/non-real time operation, an instruction execution possibility, an instruction execution frequency, memory access frequency, type of memory, or a power distribution of the circuit design in the system. For example, the instruction set and the data set for the real time operation can be segmented into at least one of the four 32 MB segments, while the instruction set and the data set for the non-real time operation can be segmented into the at least one of the remaining 32 MB segments. The segments are, respectively, loaded into the memory blocks (step S32). In some other embodiments, the segments are loaded into the memory blocks according to a certain pattern, such as two segments are loaded into one memory blocks.

Then, depending on a second predetermined rule, such as the memory access pattern or a condition for the timing requirement of operations in an event, such as the low battery event, which obtained through the software management message, the auxiliary logic 13 can control the power supplying unit 12 to individually switch the power supplied to at least one of the memory blocks MB#1~MB#n on or off (step S33).

In the step S33, if the power supplied to one memory block is determined to be switched off depending upon a memory access pattern or the timing requirement of operations, the segment of this memory block can be transferred to the secondary memory 14 for storage before the power supplying unit 12 switches the power supplied to this memory block off. Alternatively, if the power supplied to one memory block is determined to be switched on depending upon a memory access pattern or the timing requirement of operations, the segment correlated with this memory block which was previously transferred to the secondary memory 14 can be restored from the secondary memory 14 to the memory block after the power supplying unit 12 switches on the power supplied to this memory block.

Figure 4:
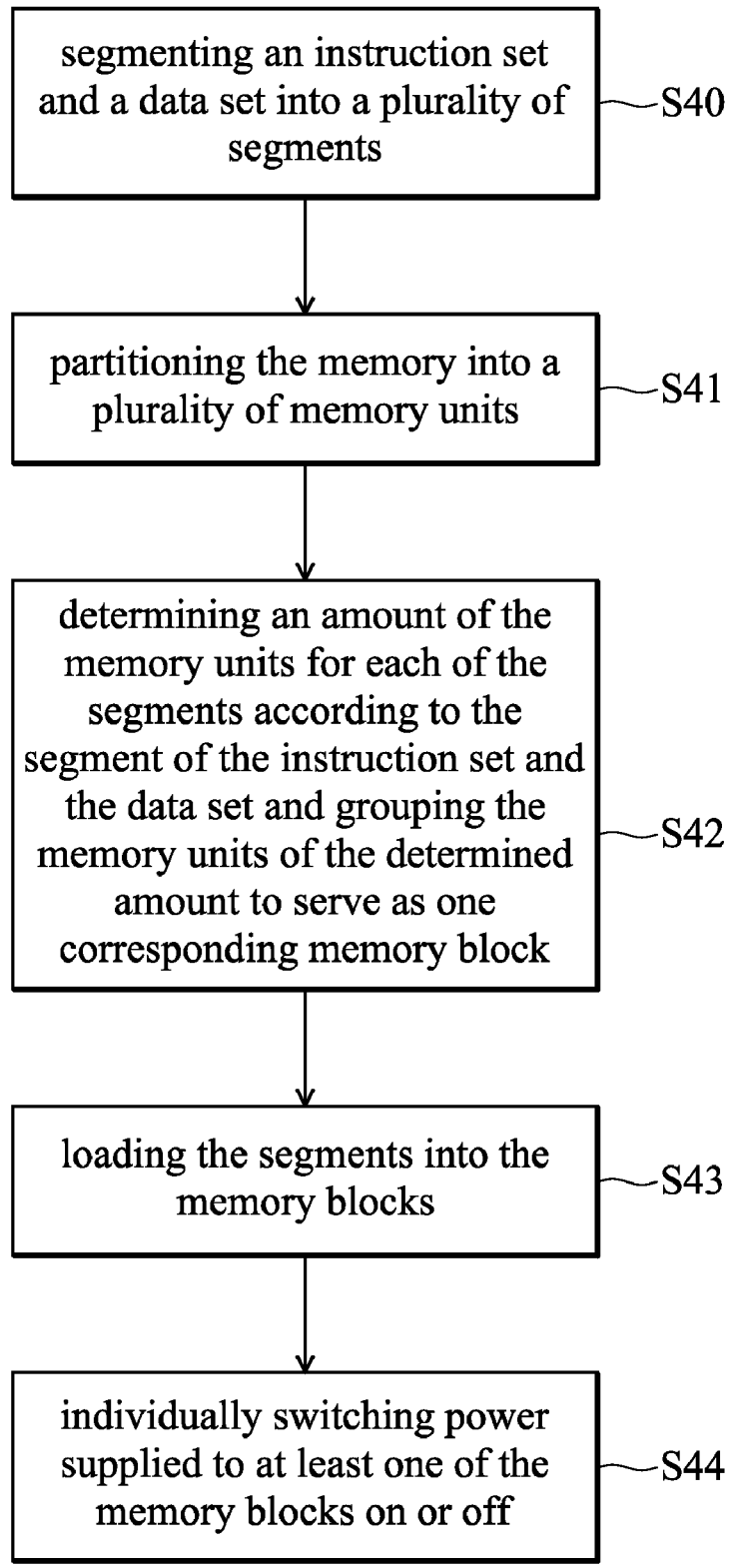
FIG. 4 is a flow chart of another exemplary embodiment for reducing power consumption of a device of the invention.

FIG. 4 is a flow chart of an exemplary embodiment of a method for reducing power consumption of a device. The method will be described by referring to FIGS. 1-2 and 4. First, the instruction set of a software module executed by the processor 10 and the data set of the software module consumed by the instruction set are segmented into a plurality of segments according to an operation requirement (step S40), such as a real time/non-real time operation, an execution possibility, or an execution frequency. For example, the instruction set and the data set for the real time operation and the instruction set and the data set for the non-real time operation are individually segmented into the segments. The embedded memory module 11 is partitioned into a plurality of memory units (step S41). The amount of the memory units for each segment is determined according to the segmentation of the instruction set and the data set, such as the size of each segment, and the memory units of the determined amount are grouped to serve as one corresponding memory block (step S42) Thus, the sizes of the memory blocks may be different size. The segments are, respectively, loaded into the memory blocks (step S43). In some other embodiments, the grouping pattern might be varies, such that the first memory unit is grouped into a first memory block, the second memory unit and the third memory unit are grouped into a third memory block, and the second memory block leave blank for other particular purpose. The grouping pattern might be the first memory unit are both grouped into a plurality of memory blocks or the plurality of memory units are both grouped into one single memory block.

Depending on the memory access pattern or the timing requirement of operations for a predetermined event, such as low battery power, the auxiliary logic 13 can control the power supplying unit 12 to switch the power supplied to at least one of the memory blocks MB#1~MB#n (step S44) on or off.

In the step S44, if the power supplied to one memory block is determined to be switched off depending on a memory access pattern or the timing requirement of operations, the segment of this memory block can be transferred to the secondary memory 14 for storage before the power supplying unit 12 switches the power supplied to this memory block off.

Alternatively, if the power supplied to one memory block is determined to be switched on depending on a memory access pattern or the timing requirement of operations, the segment correlated with this memory block which was previously transferred to the secondary memory 14 can be restored from the secondary memory 14 to the memory block after the power supplying unit 12 switches the power supplied to this memory block on, According to the above embodiments, the power supplied to the memory blocks can be switched on or off individually. When the process 10 is in the fully operational mode, the power supplied to the memory block(s) for the unused instructions and data can be switched off, thereby reducing power consumption in the fully operational mode.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reducing power consumption of a device with an embedded memory module, the method comprising:
   partitioning the embedded memory module into a plurality of memory blocks;
   segmenting an instruction set and a data set of a software module into a plurality of segments in accordance with a first predetermined rule, wherein the first predetermined rule is determined according an operation requirement; and
   loading the plurality of segments into the plurality of memory blocks;
   wherein the plurality of memory blocks are switched on or off individually in accordance with a condition, and before the power supplied to one of the memory blocks is switched off, the segment of the memory block is transferred to a secondary memory.

2. The method as claimed in claim 1, wherein the condition is determined according to a control management message or a second predetermined rule.

3. The method as claimed in claim 2, wherein the second predetermined rule is a memory access pattern.

4. The method as claimed in claim 2, wherein the control management message is for indicating a low-battery power event.

5. The method as claimed in claim 1, wherein the operation requirement is determined according to the size of the plurality of memory blocks.

6. The method as claimed in claim 1, wherein the operation requirement comprises a real time/non-real time operation, an instruction execution possibility, an instruction execution frequency, memory access frequency, type of memory, or a power distribution of a circuit design in the device.

7. The method as claimed in claim 1, wherein the segment of the memory block is restored from the secondary memory to the memory block after the power supplied to the memory block is switched on.

8. The method as claimed in claim 1, wherein the embedded memory is a tightly coupled memory.

9. A method for reducing power consumption of a device with an embedded memory module, the method comprising:
   segmenting an instruction set and a data set of a software module into a plurality of segments;
   partitioning the embedded memory module into a plurality of memory blocks in accordance with a first predetermined rule, wherein the first predetermined rule is determined according to the size of the plurality of segments; and
   loading the plurality of segments into the plurality of memory blocks;
   wherein the plurality of memory blocks are switched on or off individually in accordance with a condition.

10. The method as claimed in claim 9, wherein the step of partitioning the embedded memory module comprises:
    partitioning the embedded memory module into a plurality of memory units; and
    determining an amount of the memory units for each of the segments according to sizes of each of the segments, wherein the memory units of the determined amount are grouped to serve as one corresponding memory block.

11. A device with an embedded memory module comprising:
    a processor;
    an embedded memory module accessed by the processor, wherein the embedded memory module is partitioned into a plurality of memory blocks in accordance with a first predetermined rule;
    a software module comprising an instruction set and a data set, wherein the software module is segmented into a plurality of segments in accordance with a second predetermined rule;
    a power supplying unit for providing power to the plurality of memory blocks;
    an auxiliary logic for controlling the power supplying unit, wherein the power supplied to a memory block is switched on or off in accordance with a condition; and
    a secondary memory, wherein before auxiliary logic controls the power supplying unit to switch off the power supplied to one of the memory blocks, the segment of the memory block is transferred to the secondary memory.

12. The device as claimed in claim 11, wherein the first predetermined rule is determined according to a first operation requirement and the instruction set and the data set are segmented into a plurality of segments according to the partition of the memory, and the segments are loaded into the memory blocks.

13. The device as claimed in claim 12, wherein the first operation requirement is determined according to the size of the plurality of memory blocks.

14. The device as claimed in claim 12, wherein the first operation requirement comprises a real time/non-real time operation, an instruction execution possibility, an instruction execution frequency, memory access frequency, type of memory, or a power distribution of the circuit design in the device.

15. The device as claimed in claim 11, wherein the second predetermined rule is determined according to a second operation requirement and the embedded memory module is partitioned into the memory blocks according to the segmentation of the instruction set and the data set, and the segments are loaded into the memory blocks.

16. The device as claimed in claim 15, wherein the second operation requirement is determined according to the size of the plurality of segments.

17. The device as claimed in claim 11, wherein after the auxiliary logic controls the power supplying unit to switch on the power supplied to the memory block, the segment correlated with the memory block is restored from the secondary memory to the memory block.

18. The device as claimed in claim 11, wherein the embedded memory module is a directly-attached memory and the embedded memory module and the processor are consisted in a system on chip.

* * * * *